(12) United States Patent
Schneider et al.

(10) Patent No.: US 8,339,124 B2
(45) Date of Patent: Dec. 25, 2012

(54) METHOD FOR MANUFACTURING A MOUNTING ELEMENT WITH AN ANGLE SENSOR

(75) Inventors: Erwin Schneider, Liederbach (DE); Werner Wallrafen, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 612 days.

(21) Appl. No.: 12/444,564

(22) PCT Filed: Sep. 28, 2007

(86) PCT No.: PCT/EP2007/060291
§ 371 (c)(1),
(2), (4) Date: Apr. 6, 2009

(87) PCT Pub. No.: WO2008/040680
PCT Pub. Date: Apr. 10, 2008

(65) Prior Publication Data
US 2010/0109654 A1 May 6, 2010

(30) Foreign Application Priority Data
Oct. 4, 2006 (DE) .................. 10 2006 046 984

(51) Int. Cl.
*G01B 7/30* (2006.01)
(52) U.S. Cl. .................. 324/207.2; 324/207.25
(58) Field of Classification Search ........ 324/207.2, 324/207.11, 207.25, 173, 174
See application file for complete search history.

(56) References Cited

U.S. PATENT DOCUMENTS

| | | | |
|---|---|---|---|
| 5,637,995 A | 6/1997 | Aoyama | |
| 6,326,779 B1 | 12/2001 | Hatazawa | |
| 7,084,620 B2 | 8/2006 | Tsujii et al. | |
| 7,425,824 B2 * | 9/2008 | Busch | 324/207.25 |
| 2001/0007379 A1 * | 7/2001 | Grams et al. | 264/272.17 |
| 2003/0011360 A1 | 1/2003 | Jausel et al. | |
| 2003/0173955 A1 * | 9/2003 | Uenoyama | 324/207.21 |
| 2007/0126088 A1 * | 6/2007 | Frazee et al. | 257/666 |
| 2007/0139044 A1 * | 6/2007 | Lamb et al. | 324/252 |
| 2008/0218158 A1 * | 9/2008 | Carlson et al. | 324/207.2 |

FOREIGN PATENT DOCUMENTS

| | | |
|---|---|---|
| DE | 4115883 A1 | 11/1991 |
| DE | 19618631 A1 | 11/1997 |
| DE | 10320145 A1 | 5/2004 |
| EP | 1275939 A | 1/2003 |

* cited by examiner

*Primary Examiner* — Reena Aurora
(74) *Attorney, Agent, or Firm* — Cozen O'Connor

(57) ABSTRACT

The method is used for manufacturing a mounting element with an angle sensor for an actuator in an internal combustion engine. The mounting element has electrical connections (20) and contains an angle sensor (24, 26, 30). To simplify manufacture, electronic components (24, 26, 30) are electrically connected directly to a leadframe (12). Next, the leadframe (12) with the electronic components (24, 26, 30) is overmoulded with thermoset (132), and the resultant angle sensor module (10) is assembled with a preproduced mounting element. The mounting element itself may be made of thermoplastic or thermoset and comprises a plug connection (20).

19 Claims, 5 Drawing Sheets

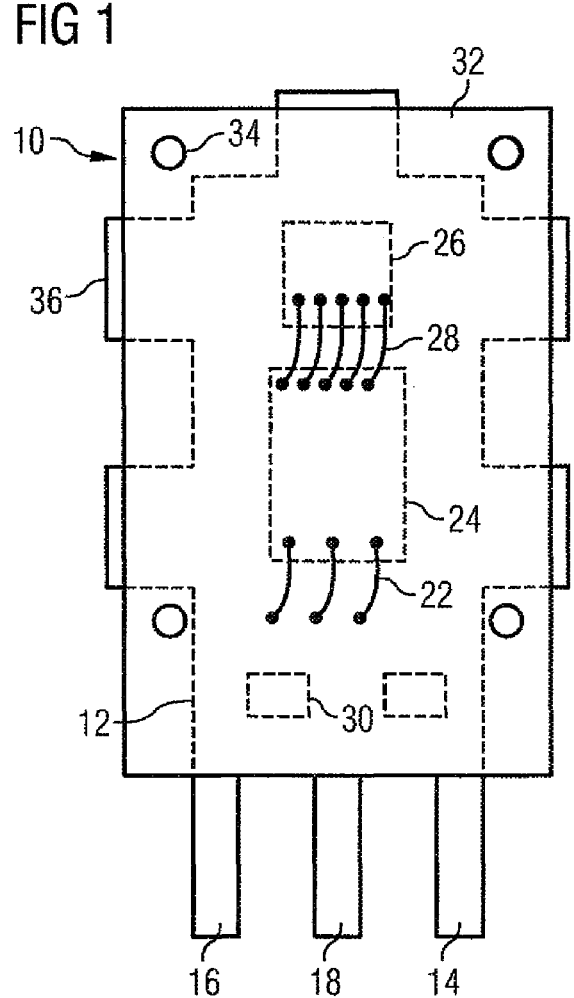
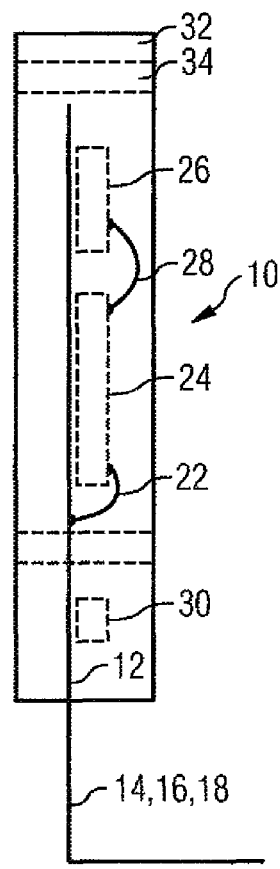

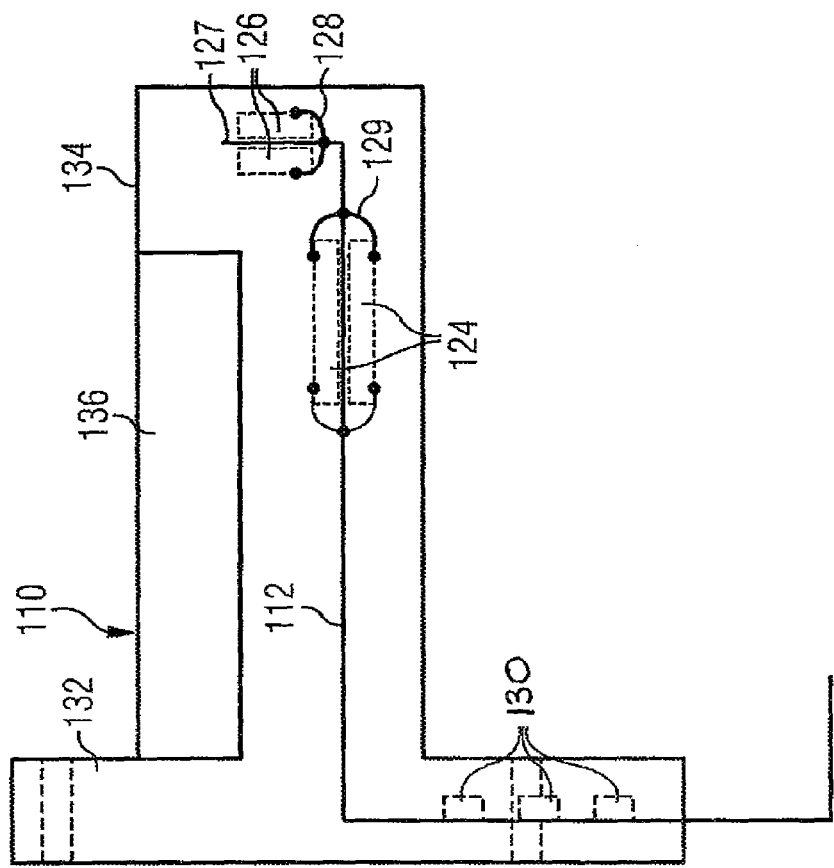
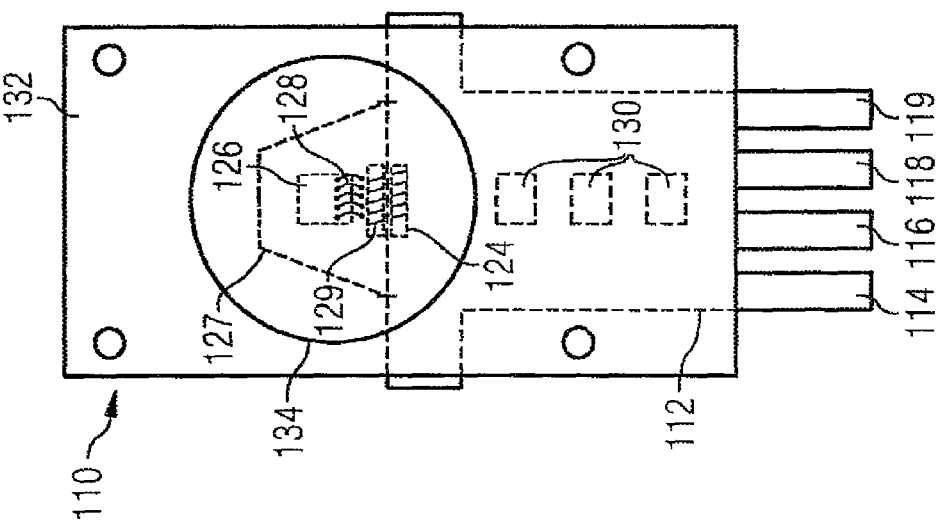

METHOD FOR MANUFACTURING A MOUNTING ELEMENT WITH AN ANGLE SENSOR

PRIORITY CLAIM

This is a U.S. national stage of application No. PCT/EP2007/060291, filed on 28 Sep. 2007. Priority is claimed on the following application: Country: Germany, Application No.: 10 2006 046 984.4, Filed: 4 Oct. 2009; the content of which is incorporated herein by reference.

BACKGROUND OF THE INVENTION

1. Field of the Invention

The present invention relates to a method for producing a support element, a housing lid or for insertion into a housing lid, having an angle sensor for sensing the angle of rotation of a shaft rotating in a housing an electrical plug-in connections, wherein the support element comprises plastic, e.g. thermoset or thermoplastic, and electrical components are overmolded or recast with a plastic. The subject matter of the present invention is also a support element having an angle sensor for an actuator in an internal combustion engine, wherein the angle sensor comprises a magnet, associated with the actuator, and electronic components equipped with electrical plug-in connections, such as a consumer plug.

2. Prior Art

Support elements with an integrated angle sensor are used in internal combustion engines, to sense the rotary position of actuators for controlling the internal combustion engine, for example for load control, exhaust return, air flaps in the intake section or the adjustment of the blades in a turbocharger. The design as a housing lid has the advantage that the angle sensor itself is sealed in a physical unit to be protected, the electrical connections are in the form of consumer plugs configured according to customer requirements for electrical connection to the engine electronics.

The actual angle sensor usually comprises at least one magnetoresistive measurement pickup or Hall sensor, typically a semiconductor wherein the measurement pickup has a respective associated chip with evaluation electronics. Frequently, the angle sensor also comprises capacitors in order to improve electromagnetic compatibility. An advantage is the redundant design with two measurement pickups and two associated evaluation electronic units in order to increase security when sensing the rotation angle position of a throttle valve (E-gas), for example.

The production of housing lids, with an integrated angle sensor has been such that the measurement pickup and the evaluation electronics unit are preconfigured by a chip manufacturer, i.e. the chip for the evaluation electronics unit and the measurement pickup are electrically connected, for example by bonding, to a stamped grid for the purpose of making external contact, and then the electronic components are individually overmolded with a thermoset. A check is then performed by the manufacturer, and the preconfigured angle sensor is then supplied to a customer. The latter obtains a housing lid blank comprising plastic, which is usually produced by means of injection molding, from a further manufacturer and produces the angle sensor module by first of all electrically connecting the preconfigured angle sensor to what is known as a leadframe by welding or soldering. Next, the leadframe is inserted into the housing blank, and the leadframe is overmolded with a thermoplastic, a separate cover needing to protect the sensor system, since it would otherwise be damaged. Finally, it is again necessary to perform an operational check on the finished housing lid.

In summary, the production method to date can be characterized by three injection-molding operations, with both the partial overmolding of the stamped grid by the chip manufacturer and the final overmolding of the leadframe for connection to the housing lid needing to take place under particular process conditions in order to avoid the risk of operational faults. Finally, two operational checks are also required, namely by the chip manufacturer following production of the sensor and by the manufacturer of the support element following overmolding of the leadframe.

The definition of the actual angle sensor on the support element by overmolding also inevitably results in the measurement pickup being separate from the rotary magnet to be sensed by virtue of at least two plastic walls or layers. The resultant greater interval impairs measurement accuracy and requires stronger magnets.

DE 196 18 631 A1 discloses the practice of filling a housing of a measuring apparatus completely with casting compound after the electrical components have been arranged. DE 4 115 883 A1 describes the production of a casting with embedded electrodes, and EP 1 275 939 A2 describes an angle sensor seated on a printed circuit board.

SUMMARY OF THE INVENTION

An object of the present invention is to specify a method for producing a housing lid or other support element with an angle sensor that is simplified in comparison with known production methods.

The invention provides for the electronic components of the angle sensor to be electrically connected directly to a leadframe, for the leadframe, without the support element with the electronic components, to be overmolded or recast with a thermoset to form an angle sensor module, and for the angle sensor module finally to be inserted inside the housing in which the shaft is seated into a receptacle in the support element, to be secured and to be connected to the electrical connections.

The invention provides for the electronic components of the angle sensor to be electrically connected directly to a leadframe, for the leadframe without the support element with the electronic components to be overmolded or recast with a thermoset to form an angle sensor module, and for the angle sensor module finally to be inserted into a receptacle in the support element, to be secured and to be connected to the electrical connections.

According to one embodiment of the method two injection-molding operations are performed, and the partial overmolding of a stamped grid fitted with components, which has to date been provided in advance, is dispensed with and the electronic components of the angle sensor are electrically connected directly to the leadframe. This reduces the number of electrical connections to be provided within the angle sensor module, and the risk of operational failure is reduced. It is an advantage in this context that only a single operational check needs to be performed following the overmolding with thermoset.

By way of example, the electronic components are at least one measurement pickup and at least one evaluation electronics unit associated with a measurement pickup, the further components connected to the leadframe being able to be capacitors for improving electromagnetic compatibility. Whereas chiefly thermoset is suitable for overmolding the leadframe with the sensitive electronic components and the electrical connections produced by bonding, soldering or conductive adhesive bonding, for example, the support element itself can also comprise other plastics, for example injection-molded thermoplastic.

One preferred development of the method provides for the leadframe to be positioned by direct application to defined points on the support element or in the housing lid. This makes it possible to achieve an optimum position for the measurement pickups in the housing lid without tolerance influences as a result of the plastic, but this optimum position can also be ensured by other measures.

For the purpose of forming a redundant system with at least two measurement pickups, the leadframe is bent in either a Z shape or L shape, for example, with a respective measurement pickup or two measurement pickups being electrically connected next to one another at that end of the leadframe on each side which projects into the housing interior, and the inwardly projecting region of the leadframe being completely overmolded with thermoset. This design ensures that both measurement pickups are arranged in a rotating, homogeneous magnetic field, so that they produce essentially identical output signals avoid accumulations of material, which means a longer waiting time particularly due to the higher thermally relevant mass in the case of temperature calibrations, rib-like hollows can be provided in the region of the overmolding of the region projecting into the housing.

The electrical connection between the angle sensor module and the support element can be made using weld joints or plug-and-socket connections with a clamping action, which can also ensure a mechanical hold. The mechanical hold between the angle sensor module and the housing lid can also be achieved or improved by adhesive bonding or clipping.

One embodiment of the invention is a support element with an angle sensor for an actuator in an internal combustion engine, which support element has been presented on the basis of one of the methods described above. The angle sensor comprises a rotary magnet, which is associated with the actuator and rotates in a housing, and electronic components and also electrical connections. A support element of this kind itself comprises a plastic, such as a thermoset or thermoplastic, to which a separate angle sensor module is mechanically and electrically connected, wherein the angle sensor module has a leadframe connected to electrical components of the angle sensor, and the leadframe with the electronic components is overmolded or recast with a thermoset separately from the support element, the leadframe of the angle sensor module is completely surrounded by thermoset, so as to be electrically insulated, in the region between the at least one measurement pickup and the evaluation circuit, and the at least one measurement pickup has only a single layer of thermoset as a partition from the rotary magnet. The electronic components comprise the at least one measurement pickup and also an evaluation circuit for the relevant measurement pickup signal. The measurement pickups are magnetically based measurement pickups with magnetoresistive properties or at least one Hall element. To improve electromagnetic compatibility, the leadframe is electrically connected to at least one capacitor.

An advantage of the housing lid with an integrated angle sensor which has been described is also that the at least one measurement pickup is coated with a single layer of plastic. This allows the width of the gap between the measurement pickup and the moving magnet element to be reduced in comparison with two plastic layers, as will be found in the prior art, since, from a production point of view, only certain minimum layer thicknesses need to be observed for injection-molding operations. The leadframe is preferably to one side in the region of the at least one measured value pickup, as close as possible to the surface within the thermoset mass.

The electrically insulating enclosure of the connecting regions of the leadframe between the measured value pickup and the evaluation circuit allows the angle sensor module to be directly secured on the support element without subsequent insulation, since the conductors cannot be shorted by particles of dirt.

A redundant sensor system is implemented in the angle sensor module by virtue of two measurement pickups being arranged parallel to one another on both sides of the leadframe or next to one another and being respectively connected to a separate or common evaluation electronics unit, for example. So that both measurement pickups can cooperate with the same magnetic fields, it is preferred for the two measurement pickups in parallel with one another to be arranged in a dome comprising thermoset parallel to the abutting face of said dome, with the leadframe protruding into this projection in a Z shape or L shape. To prevent accumulations of material, the thermoset may have rib-like hollows in the region of the dome.

BRIEF DESCRIPTION OF DRAWINGS

Exemplary embodiments of the invention will be discussed in more detail below with reference to the appended drawings, in which:

FIG. 1 is of an angle sensor module for a housing lid;

FIG. 2 is a section through the angle sensor module shown in FIG. 1;

FIG. 3 is a view of an angle sensor module for a housing lid with a redundant sensor system;

FIG. 4 is a section through the angle sensor module from FIG. 3;

DETAILED DESCRIPTION OF THE DRAWINGS

Figure 5:
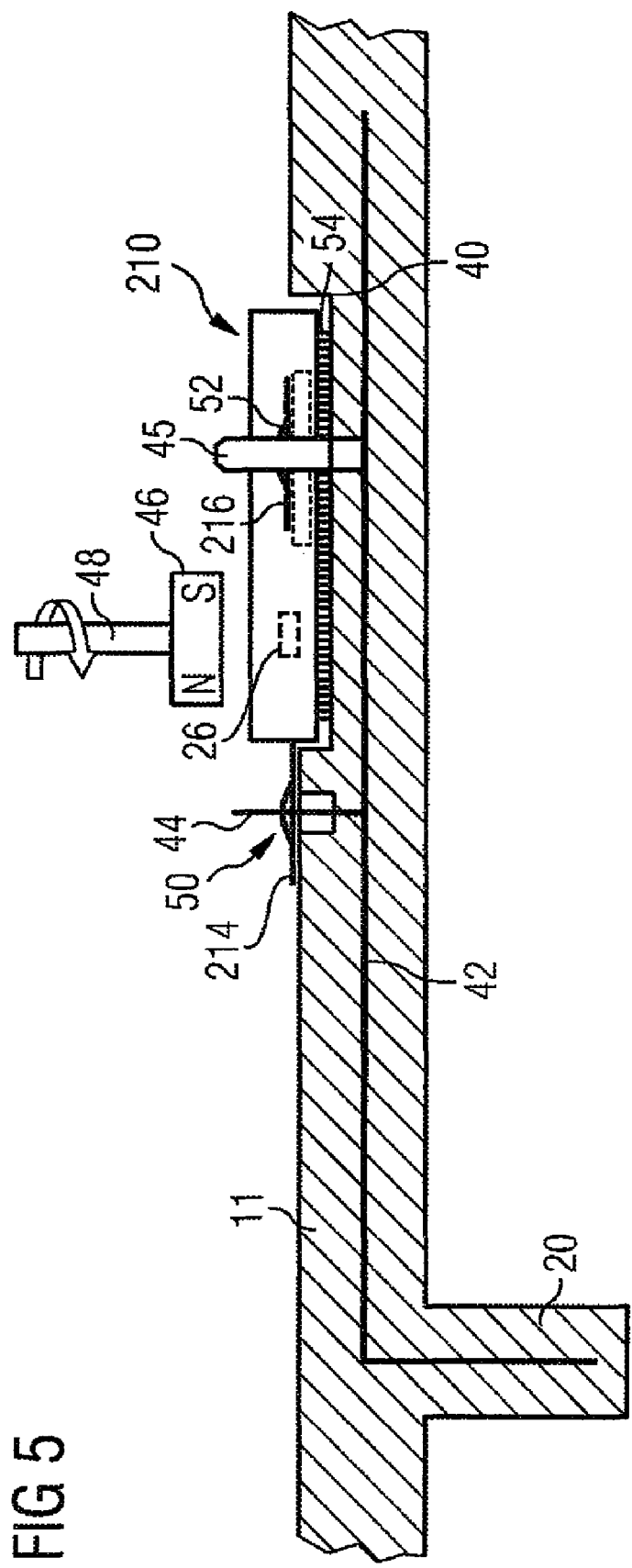
FIG. 5 is a partial section through a housing lid with an inserted angle sensor module as shown in FIG. 6.
Figure 6:
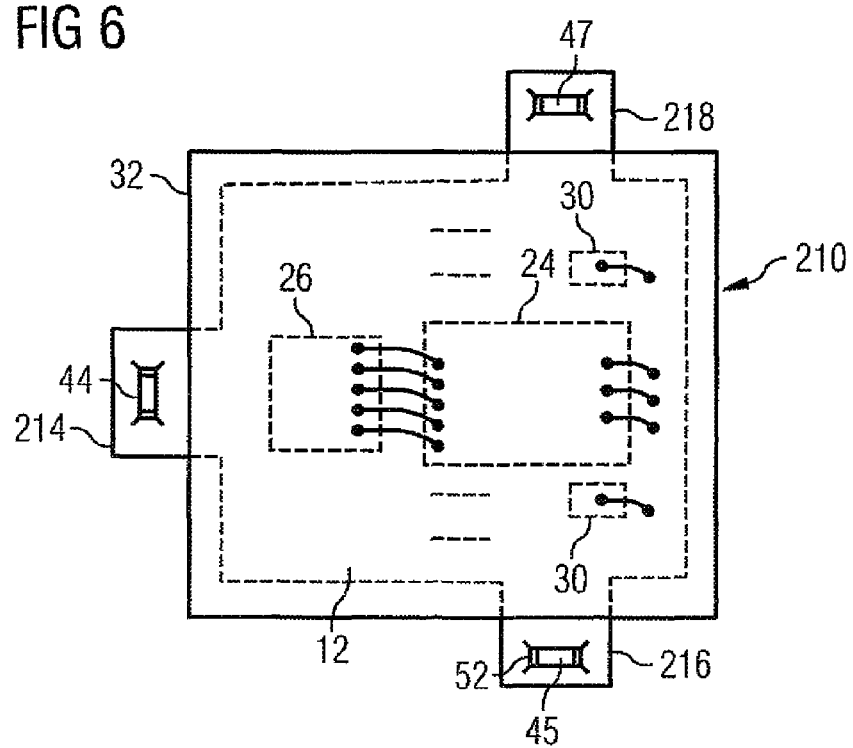
FIG. 6 is a plan view of the angle sensor module from FIG. 5.
Figure 8:
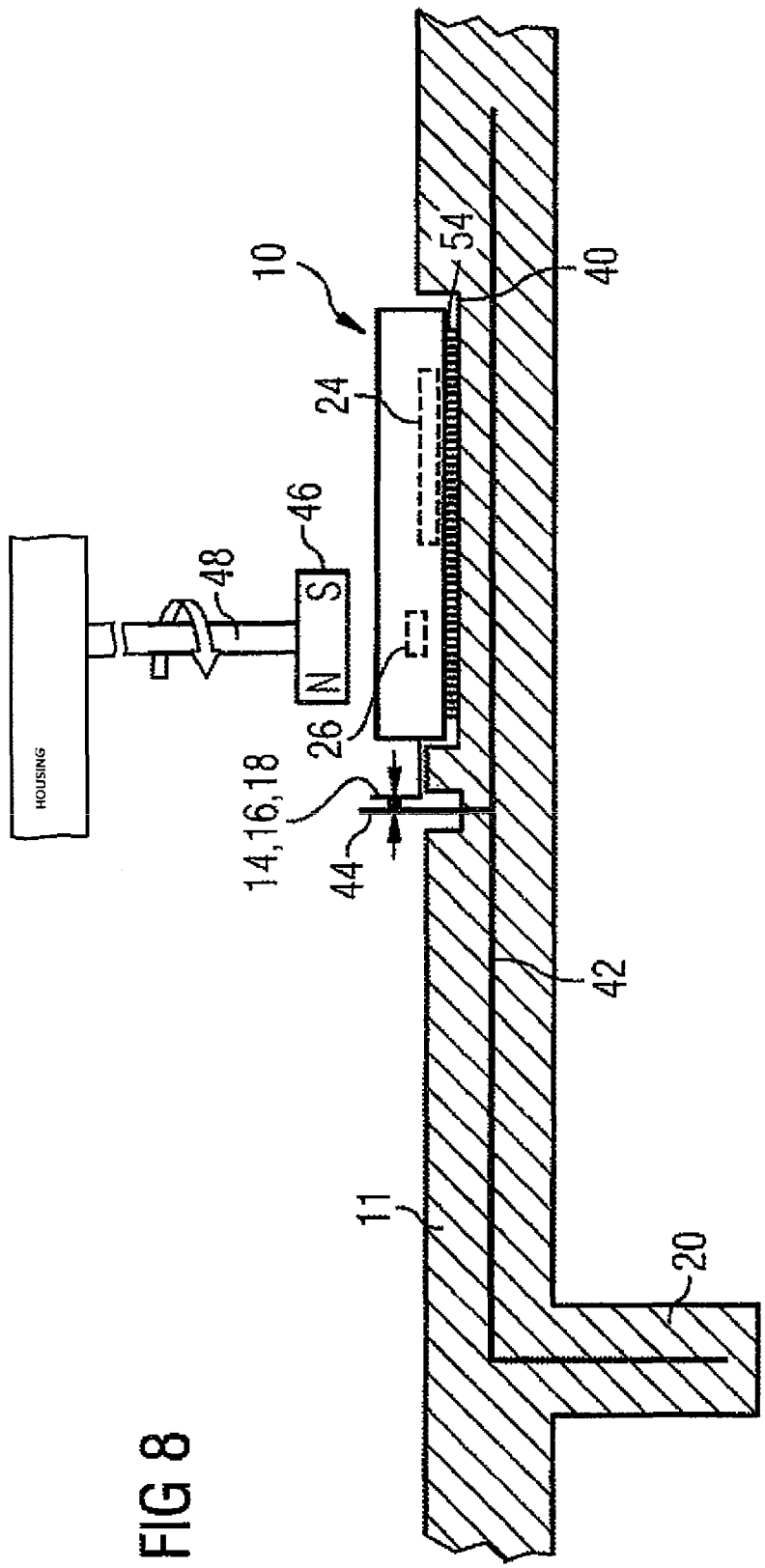
FIG. 8 is a partial section through a housing lid with an adhesively bonded angle sensor module as shown in FIG. 1 with welded electrical contacts.

FIG. 1 shows an angle sensor module 10 for a housing lid (see FIGS. 5 and 8). The angle sensor module 10 has a leadframe 12 with free contact ends 14, 16, 18 that are used as electrical contacts for connection to a further leadframe in the housing lid, which also forms a consumer plug 20 (see FIGS. 5 and 6) that is configured according to customer requirements. The three electrical contacts 14, 16, 18 of the leadframe 12 are directly connected to a circuit 24, which is an evaluation electronics unit for a measured value pickup 26, by means of bonded electrical connections 22. The measured value pickup 26, is preferably a magnetoresistive sensor or a Hall sensor, which is connected to the evaluation electronics unit 24 by means of bonded supply lines 28. In addition, the contacts 14, 16, 18 have capacitors 30 provided between them which improve the electromagnetic compatibility of the angle sensor module 10.

The leadframe 12 with the contact-connected electrical components 24, 26, 30 is overmolded or recast with a thermoset 32, which makes the angle sensor module insensitive to external influences.

The angle sensor module 10 is inserted into a housing lid, and can be positioned by means of holes 34 or else by stop edges 36 of the leadframe itself. This will be discussed in more detail below in connection with FIGS. 5 and 6.

A redundant angle sensor module 110 is shown in FIG. 3 and FIG. 4. In the case of this angle sensor module, the thermoset coating 132 is again first of all produced around a leadframe 112 with electrically connected electronic components 124, 126, 130, and then the angle sensor module is inserted into the housing lid.

The angle sensor module shown in FIG. 3 has a redundant sensor system with two measurement pickups 126, which are arranged parallel to one another on both sides of one end 127 of a leadframe 112 angled off in a Z shape. The measured value pickups 126 are connected to associated evaluation electronics units 124 by connections 128, preferably by interconnects on the leadframe, which are then in turn connected by means of connections 129 to the evaluation circuits 124. As a result of the design of the leadframe 112, which in this case is a Z-shaped design, a cylindrical dome 134 which has partially rib-like hollows 136 is produced following the overmolding with the thermoset 132. This design allows both measured value pickups 126 to be arranged in a homogeneous magnetic field which is formed by magnet elements surrounding the projection 134. In line with the two output channels of the two measured value pickups 126, the angle sensor module 110 has four connection contacts 114, 116, 118, 119, which are again angled off. Since the angle sensor module 110 shown in FIGS. 3 and 4 is provided with two output channels, three capacitors 130 are necessary in order to improve electromagnetic compatibility.

FIG. 5 shows a cross section through a housing lid 11 which has a recess 40 in which an angle sensor module 210 has been inserted. The housing lid 11 has a second leadframe 42 which is overmolded with thermoplastic or thermoset to form the housing. The second leadframe 42 forms a plug-and-socket connection 20 which is designed according to customer requirements and to which it is possible to connect a plug connector for connection to the control of an engine. On the opposite inner side of the housing, the leadframe has electrical contact connections 44, 45, which are used for connection to the electrical connections (214, 216, 218 not shown) the angle sensor module 210. FIG. 5 also shows a rotary magnet 46 which sits on a shaft 48 of an actuator (not shown) and whose rotation angle position can be sensed using the angle sensor module. In the case of the angle sensor module 210 shown in FIG. 6, the measured value pickup 26 is positioned in line with the position of the rotary magnet 46.

The previously described angle sensor module 210 is connected to the housing lid 11 by simply pressing it on, the contact region between the electrical connections 214, 216, 218 of the angle sensor module 210 and the electrical contact connections 44, 45, 47 of the second leadframe 42 of the housing lid 11 containing, by virtue of the basic principle, known plug-and-socket connections 50 in which spring tongues 52 bear with sharp edges against the contact partner. Since such plug-and-socket connections also ensure a good and precise mechanical hold as a result of their sturdy clamping, clever dimensioning makes it possible to dispense with further securing measures, with the positioning being able to be effected using alignment pins (not shown) on the plastic housing of the housing lid 11 which engage in the holes 34 in the angle sensor module 210 (in this regard see also FIGS. 1 and 2). To improve the hold and prevent displacement of the angle sensor module at high accelerations, for example, the angle sensor module 210 and the housing lid 11 may have an adhesive layer 54 provided between them.

Figure 7:
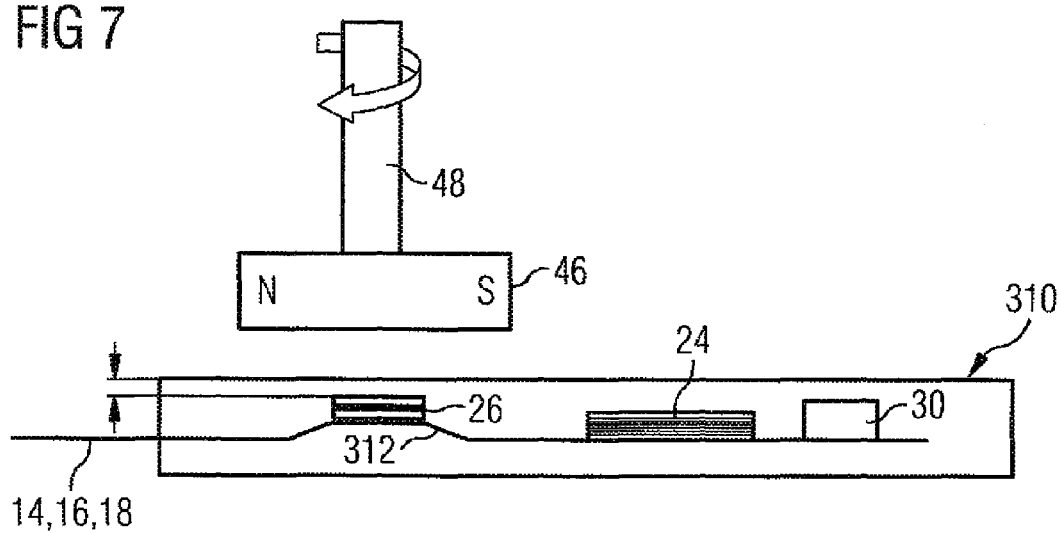
FIG. 7 is a section through a further embodiment of an angle sensor module.

FIG. 7 shows a further embodiment of an angle sensor module 310, in which the leadframe 312 is shaped in trapezoidal form by embossment in the region of the measured value pickup 26, so that it is closer to the rotary magnet 46, i.e. the thermoset layer between the magnet 46 and the measurement pickup is minimized, which results in better measurement accuracy and allows the use of smaller magnets. The arrangement of the evaluation electronics unit 24 and of the capacitor 30 corresponds to the embodiment shown in FIG. 6.

FIG. 8 shows a housing lid 11 which essentially corresponds to the housing lid shown in FIG. 5, having the electrical contact connections 44, 45, 47 being situated directly next to one another and preferably not being used for mechanically fixing the angle sensor module. The electrical connection between the connection lugs 14, 16, 18 of the angle sensor module and the electrical contact connections 44, 45, 47 are made by welding, while the angle sensor module 10, which corresponds to the embodiment shown in FIG. 1, is held on the housing lid 11 primarily by the adhesive layer 54. The positioning is again effected using the holes 34 and the alignment pins—not shown—associated with the housing lid 11 or using a clamp and/or latch connection between the angle sensor module and the housing lid.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing an angle sensor apparatus having a support element and an angle sensor module for sensing an angle of rotation of a shaft rotating in a housing, the support element being part of the housing and comprising electrical plug-in connections, the method comprising:
   electrically connecting a plurality of electronic components directly to a leadframe;
   at least one of overmolding and recasting the leadframe and the plural electronic components with a thermoset to form the angle sensor module;
   inserting the angle sensor module inside the housing in which the shaft rotates, by inserting the angle sensor module in a receptacle of the support element, an open end of the receptacle facing the shaft;
   securing the angle sensor module to the support element; and
   connecting the angle sensor module to the plug-in connections.

2. The method according to claim 1, wherein the plural electronic components are at least one measured value pickup and at least one evaluation electronics unit associated with the at least one measured value pickup.

3. The method according to claim 2, wherein the plural electronic components further comprise at least one capacitor connected for electromagnetic compatibility.

4. The method according to claim 3, wherein the leadframe is bent in one of a Z-shape or an L-shape, the leadframe having a first end that projects into the housing interior with one of the at least one measurement pickup and two measurement pickups being electrically connected side by side on the first end, and the inwardly projecting region of the leadframe being at least one of completely overmolded or recast with thermoset.

5. The method according to claim 1, wherein the electrical connection with the components is made by at least one of bonding, soldering, and conductive adhesive bonding.

6. The method according to claim 1, further comprising injection molding at least one of thermoset or thermoplastic to form the support element configured as a housing lid comprising with the plug-in connections.

7. The method according to claim 6, wherein the leadframe is positioned by direct application to at least one of defined points on the support element and in the housing lid.

8. The method according to claim 1, wherein the angle sensor module is at least one of mechanically and electrically connected to the support element by a plug-and-socket connection with a clamping action.

9. The method according to claim 1, wherein the leadframe of the angle sensor module is electrically connected to a leadframe of the support element by one of a solder joint and a weld joint.

10. The method according to claim 1, wherein the angle sensor module is adhesively bonded to the support element.

11. A method for producing an angle sensor apparatus having an angle sensor for sensing an angle of rotation of a shaft rotating in a housing comprising electrical plug-in connections, a plastic support configured to support the angle sensor, and a plurality of electronic components, the method comprising:
 electrically connecting the plural electronic components directly to a leadframe;
 at least one of overmolding and recasting the leadframe and the plural electronic components with a thermoset to form an angle sensor module;
 inserting the angle sensor module inside the housing in which the shaft rotates, wherein the angle sensor module is inserted in a receptacle of the support element;
 securing the angle sensor module to the support element; and
 connecting the angle sensor module to the plug-in connections,
 wherein the plural electronic components are at least one measured value pickup and at least one evaluation electronics unit associated with the at least one measured value pickup,
 wherein the plural electronic components further comprise at least one capacitor connected for electromagnetic compatibility,
 wherein the leadframe is bent in one of a Z-shape or an L-shape, the leadframe having a first end that projects into the housing interior with one of the at least one measurement pickup and two measurement pickups being electrically connected side by side on the first end, and the inwardly projecting region of the leadframe being at least one of completely overmolded or recast with thermoset, and
 wherein the thermoset is hollowed out in the form of ribs in the region of a dome.

12. An angle sensor apparatus having an angle sensor for an actuator in an internal combustion engine, the actuator associated with a rotary magnet arranged in a housing, the angle sensor apparatus comprising:
 a support element comprising a part of the housing and including an electrical plug-in connection; and
 an angle sensor module, the angle sensor module comprising a leadframe connected to a plurality of electrical components including at least one measured value pickup configured to output a signal based at least in part on the rotary magnet and an evaluation circuit for evaluating the relevant measured value pickup signal, the leadframe with the plural electronic components being overmolded or recast with thermoset separately from the support element to form the angle sensor module,
 wherein the leadframe of the angle sensor module is surrounded by thermoset, so as to be electrically insulated in a region between the at least one measured value pickup and the evaluation circuit, the angle sensor module being arranged in a receptacle in the support element such that the at least one measured value pickup has only a single layer of thermoset as a partition from the rotary magnet.

13. The support element as claimed in claim 12, wherein the at least one measured value pickup is a magnetically based measured value pickup with at least one of magnetoresistive elements or at least one Hall element.

14. The support element as claimed in claim 13, wherein the leadframe has at least one capacitor electrically connected to it, which is overmolded in the angle sensor module.

15. The support element according to claim 14, wherein two measured value pickups are arranged parallel to one another on both sides of the leadframe or two measured value pickups are arranged next to one another on one side of the leadframe and are electrically connected to at least one evaluation electronics unit.

16. The support element as claimed in claim 15, wherein the two measured value pickups are arranged in a cylindrical dome comprising thermoset parallel to the abutting face of said dome, with the leadframe protruding into the dome.

17. An angle sensor apparatus having an angle sensor for an actuator in an internal combustion engine, the angle sensor comprising:
 a rotary magnet associated with the actuator configured to rotate in a housing;
 at least one measured value pickup configured to output a signal based at least in part on the rotary magnet;
 an evaluation circuit for evaluating the relevant measured value pickup signal; and
 electrical connections coupled to the evaluation circuit; and
 a support element comprising a part of the housing and including an electrical plug-in connection; and
 an angle sensor module, the angle sensor module comprising a leadframe connected to a plurality of electrical components including at least one measured value pickup configured to output a signal based at least in part on the rotary magnet and an evaluation circuit for evaluating the relevant measured value pickup signal, the leadframe with the plural electronic components being overmolded or recast with thermoset separately from the support element to form the angle sensor module,
 wherein the leadframe of the angle sensor module is surrounded by thermoset, so as to be electrically insulated in a region between the at least one measured value pickup and the evaluation circuit, the angle sensor module being arranged in a receptacle in the support element such that the at least one measured value pickup has only a single layer of thermoset as a partition from the rotary magnet, wherein the at least one measured value pickup is a magnetically based measured value pickup with at least one of magnetoresistive elements or at least one Hall element, wherein the leadframe has at least one capacitor electrically connected to it, which is overmolded in the angle sensor module, wherein two measured value pickups are arranged parallel to one another on both sides of the leadframe or two measured value pickups are arranged next to one another on one side of the leadframe and are electrically connected to at least one evaluation electronics unit, wherein the two measured value pickups are arranged in a cylindrical dome comprising thermoset parallel to the abutting face of said dome, with the leadframe protruding into the dome, and wherein the dome comprises rib-like hollows.

18. The support element according to claim 17, wherein the leadframe in a region of the measured value pickup is formed as one of a trapezoidal bend or embossment such that the plastic wall thickness above the measured value pickup is minimized in the region of the measured value pickup.

19. The support element according to claim 18, wherein electrical plug-and-socket connections are provided for the support element and the angle sensor module, the angle sensor module being in the form of a housing lid or partial lid of a housing.

* * * * *